(12) United States Patent
Cheng et al.

(10) Patent No.: US 11,287,590 B2
(45) Date of Patent: Mar. 29, 2022

(54) IN-ROAD INTERFACE PROTECTED CABLE

(71) Applicant: CORNING RESEARCH & DEVELOPMENT CORPORATION, Corning, NY (US)

(72) Inventors: Xiaole Cheng, Painted Post, NY (US); Edward John Fewkes, Corning, NY (US); Michael John Gimblet, Conover, NC (US); Wesley Brian Nicholson, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 375 days.

(21) Appl. No.: 16/003,746

(22) Filed: Jun. 8, 2018

(65) Prior Publication Data

US 2018/0356608 A1    Dec. 13, 2018

Related U.S. Application Data

(60) Provisional application No. 62/518,139, filed on Jun. 12, 2017.

(51) Int. Cl.
*G02B 6/44* (2006.01)
*G02B 6/50* (2006.01)
(Continued)

(52) U.S. Cl.
CPC ............ *G02B 6/443* (2013.01); *E02F 5/10* (2013.01); *E02F 5/102* (2013.01); *E02F 5/12* (2013.01);
(Continued)

(58) Field of Classification Search
CPC ...... G02B 6/443; G02B 6/504; G02B 6/4486; H02G 1/06; E02F 5/14; E02F 5/102; E02F 5/12; E02F 5/10
See application file for complete search history.

(56) References Cited

U.S. PATENT DOCUMENTS 4,389,087 A * 6/1983 Bendayan ............ G02B 6/4402
                                                    385/102
5,329,605 A * 7/1994 Wargotz .................. C08L 95/00
                                                    385/107
(Continued)

FOREIGN PATENT DOCUMENTS

CN          104733111    *    6/2015
CN          104865655 A       8/2015
(Continued)

OTHER PUBLICATIONS

"Fiber Optic Components", Jan. 7, 2017, http://www.fiber-optic-components.com/brief-introduction-to-ribbon-optical-cable.html (Year: 2017).*

(Continued)

*Primary Examiner* — Ellen E Kim
(74) *Attorney, Agent, or Firm* — William D. Doyle (57) ABSTRACT

Embodiments of an optical fiber cable configured for installation in a roadbed are provide. The optical fiber cable includes an optical fiber, a cable jacket surrounding the optical fiber, and an upjacket surrounding the cable jacket. The upjacket does not leach a chemical or chemicals into the roadbed that soften the roadbed. Also provided are embodiments of a method of producing an optical fiber cable configured for installation in a roadbed. Further, embodiments of a method of deploying an optical fiber cable into a roadbed are provided. The method involves the steps of forming a channel in the roadbed, inserting an optical fiber cable into the channel, and closing the channel so as to bury the optical fiber cable in the roadbed.

19 Claims, 3 Drawing Sheets

(51) Int. Cl.
    *E02F 5/14*     (2006.01)
    *E02F 5/10*     (2006.01)
    *E02F 5/12*     (2006.01)
    *H02G 1/06*     (2006.01)

(52) U.S. Cl.
    CPC .............. *E02F 5/14* (2013.01); *G02B 6/4486* (2013.01); *G02B 6/504* (2013.01); *H02G 1/06* (2013.01)

(56) References Cited

U.S. PATENT DOCUMENTS

| | | | |
|---|---|---|---|
| 5,879,109 | A | 3/1999 | Finzel et al. |
| 6,714,709 | B1 * | 3/2004 | Birkeland .............. G02B 6/449 385/111 |
| 7,351,009 | B2 * | 4/2008 | Serrano .................. G02B 6/504 405/154.1 |
| 2004/0151448 | A1 | 8/2004 | Adams et al. |
| 2005/0105874 | A1 | 5/2005 | Finzel et al. |
| 2009/0123119 | A1 * | 5/2009 | Varkey ................. G02B 6/4492 385/102 |
| 2010/0215326 | A1 | 8/2010 | Zediker et al. |
| 2010/0278491 | A1 * | 11/2010 | Noddings .............. G02B 6/443 385/100 |
| 2011/0200290 | A1 * | 8/2011 | Batlle i Ferrer ..... G02B 6/4436 385/101 |
| 2013/0121656 | A1 * | 5/2013 | Chen .................... G02B 6/4471 385/135 |
| 2013/0294839 | A1 | 11/2013 | Gustavsson et al. |
| 2015/0110451 | A1 | 4/2015 | Blazer et al. |
| 2015/0300527 | A1 | 10/2015 | Konczak |
| 2015/0370026 | A1 * | 12/2015 | Hudson, II ........... G02B 6/4429 385/113 |
| 2016/0025945 | A1 * | 1/2016 | Wanjau ................... E21B 47/07 166/250.1 |
| 2016/0054533 | A1 * | 2/2016 | Blazer .................... G02B 6/443 385/109 |
| 2016/0147028 | A1 * | 5/2016 | Kumar ............... G02B 6/02395 385/103 |
| 2017/0153402 | A1 * | 6/2017 | Chiasson ............. G02B 6/4403 |
| 2017/0153405 | A1 | 6/2017 | Bringuier et al. |

FOREIGN PATENT DOCUMENTS

| | | | |
|---|---|---|---|
| CN | 105652365 | * | 6/2016 |
| EP | 1607780 | A1 | 12/2005 |
| WO | 2016/188576 | A1 | 12/2016 |

OTHER PUBLICATIONS

D. Walker, PE; "The Benefits of Modified Asphalts"; Asphalt Magazine—Online; Downloaded Aug. 20, 2018; 6 Pages; http://asphaltmagazine.com/the-benefits-of-modified-asphalts/.

International Search Report and Written Opinion PCT/US2018/036826 dated Sep. 11, 2018.

European Patent Application No. 18816750.6 Search Report and Search Opinion dated Feb. 10, 2021; 10 Pages; European Patent Office.

* cited by examiner

IN-ROAD INTERFACE PROTECTED CABLE

PRIORITY APPLICATION

This application claims the benefit of U.S. Provisional Application No. 62/518,139, filed on Jun. 12, 2017, the content of which is relied upon and incorporated herein by reference in its entirety.

BACKGROUND

The disclosure relates generally to optical fiber cables cable and more particularly to a jacket for roadbed deployment of optical fiber cables, to a method of applying a jacket to roadbed optical fiber cables, and to a system and method of deploying roadbed optical fiber cables. Optical fiber cables are used in telecommunication to transmit data at high speeds over distance. In order to do so, the optical fiber cables have to be strung across land and/or buried in the ground, including in roadways, between data sources and data delivery points.

SUMMARY

In one aspect, embodiments of an optical fiber cable configured for installation in a roadbed are provided. The optical fiber cable includes an optical fiber, a cable jacket surrounding the optical fiber, and an upjacket surrounding the cable jacket. The upjacket must be compatible with the road surface to insure continued long-term stability of the contact surface of the road, as well as prevent degradation of the constituents that make up the roadbed (e.g. by reacting with the bitumen present in the asphalt cement).

In another aspect, embodiments of a method of producing an optical fiber cable configured for installation in a roadbed are provided. The method includes the steps of providing a cable having at least one optical fiber surrounded by a cable jacket and selecting at least one material that will insure good chemical and mechanical compatibility of the cable within the roadbed. Further, the method includes the step of extruding the at least one material around the cable jacket to form an upjacket.

In still another aspect, embodiments of a method of deploying an optical fiber cable into a roadbed are provided. The method includes the steps of forming a channel in the roadbed, inserting an optical fiber cable into the channel, and closing the channel so as to bury the optical fiber cable in the roadbed. The roadbed is typically formed from asphalt concrete comprising aggregate, bitumen, and often a polymer modifier, along with other additives. The optical fiber cable is made of an optical fiber surrounded by a cable jacket defining an exterior surface of the optical fiber cable, and the cable jacket comprises the polymer additive.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiments), and together with the description serve to explain principles and operation of the various embodiments.

DETAILED DESCRIPTION

Referring generally to the figures, various embodiments of an optical fiber jacket having an upjacket adapted to be compatible with a roadbed are provided. Further, a method of applying the upjacket to the cable and a method of deploying the upjacketed cable in a roadbed are also provided. Advantageously, the upjacket of the cable does not diminish the properties of the roadbed, and in some instances, the upjacket is designed to enhance the properties of the roadbed by through materials that are used to modify and enhance the performance of the surrounding bitumen portion of the asphalt. Indeed, contrary to certain conventional cables and methods of installing cables, which in some circumstances can cause cracking or softening of the roadbed, leading to rutting, the presently disclosed upjacketed cable does not deleteriously affect the roadbed. Further, while not damaging the roadbed and in some instances providing benefits to the roadbed, the upjacket also protects the cable and decreases the overall profile of the cable. Taking advantage of the smaller cable profile, a method of deploying the cable is also provided in which the roadbed is heated or softened, a small channel is formed in the roadbed, the upjacketed cable is inserted into the channel, and the channel is resealed. In this way, installation of roadbed cables is made quicker, cleaner, and less damaging to the roadbed because only a small opening is made that may be resealed using the same roadbed material (i.e., instead of a different filler material) thereby improving compatibility of the repair patch with the surface and the cable or use may also be made of hasty or alternative patch materials should the need arise. The foregoing discussion and the following exemplary embodiments of the cable having an upjacket are provided by way of illustration and not by way of limitation; a person of ordinary skill in the art, upon consideration of the present disclosure, may recognize that the cable can be formed, applied, and/or used in different contexts beyond those discussed herein.

Figure 1:
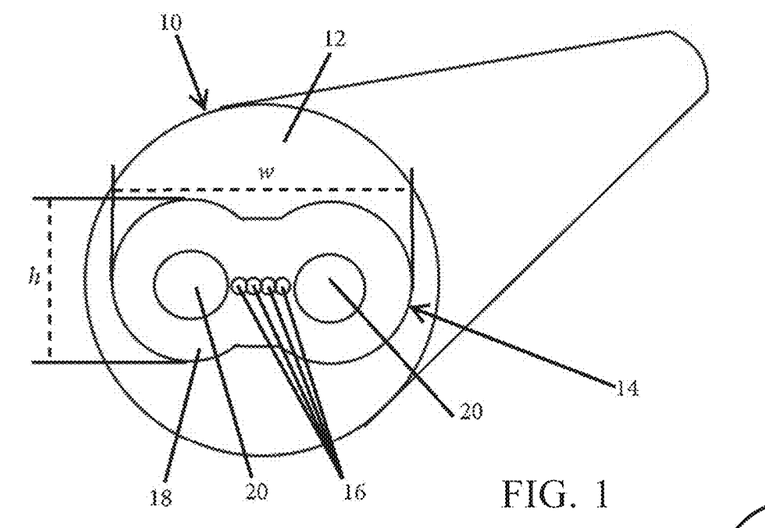
FIG. 1 depicts an optical fiber cable including an upjacket adapted to be compatible with a roadbed, according to an exemplary embodiment.

FIG. 1 depicts an optical fiber cable 10 including an upjacket 12 adapted to be compatible with roadbed materials. By "compatible," it is meant that the upjacket 12 does not leach (i.e., more than an insubstantial amount of) a chemical or chemicals into the roadbed that would have a deleterious effect on the roadbed, such as softening the roadbed, will improve the adhesion to the roadbed and be fully compliant with the chemical and mechanical design of the existing roadway. Further, in some embodiments, a "compatible" upjacket 12 may instead leach a beneficial chemical or chemicals into the roadbed, such as a chemical that stiffens the roadbed, improves low temperature characteristics, improves elasticity, etc. In the depicted embodiment, the upjacket 12 is applied to a drop cable 14, i.e., a branch from a distribution point or a larger cable. The drop cable 14 generally extends from the distribution point or the larger cable to the end subscriber's premises. In the embodiment of FIG. 1, the drop cable 14 includes four optical fibers 16; however, in other embodiments, the drop cable 14 can include more or fewer than four optical fibers 16. The optical fibers 16 of the depicted embodiment each include a single glass fiber surrounded by a fiber jacket. However, in other embodiments, the drop cable 14 instead includes either one or more buffer tubes containing multiple optical fibers 16 or at least one optical fiber ribbon composed of a plurality of optical fibers 16.

Returning to the embodiment depicted in FIG. 1, the optical fibers 16 are surrounded by a cable jacket 18. The cable jacket 18 helps protect the optical fibers 16 and prevents exposure of the optical fibers 16 to the environment. The cable jacket 18 can be made from, e.g., polyethylene, polypropylene (high, medium, and low density), linear low density polyethylene, very low density polyethylene, polyolefin elastomer, polyethylene-vinyl acetate), etc. Embedded in the cable jacket 18 are strength members 20 that provide structure and protection for the optical fibers 16 in the drop cable 14. In embodiments, the strength members 20 are metal rods or wires or are dielectric materials, such as glass fiber reinforced plastic rods.

Figure 2:
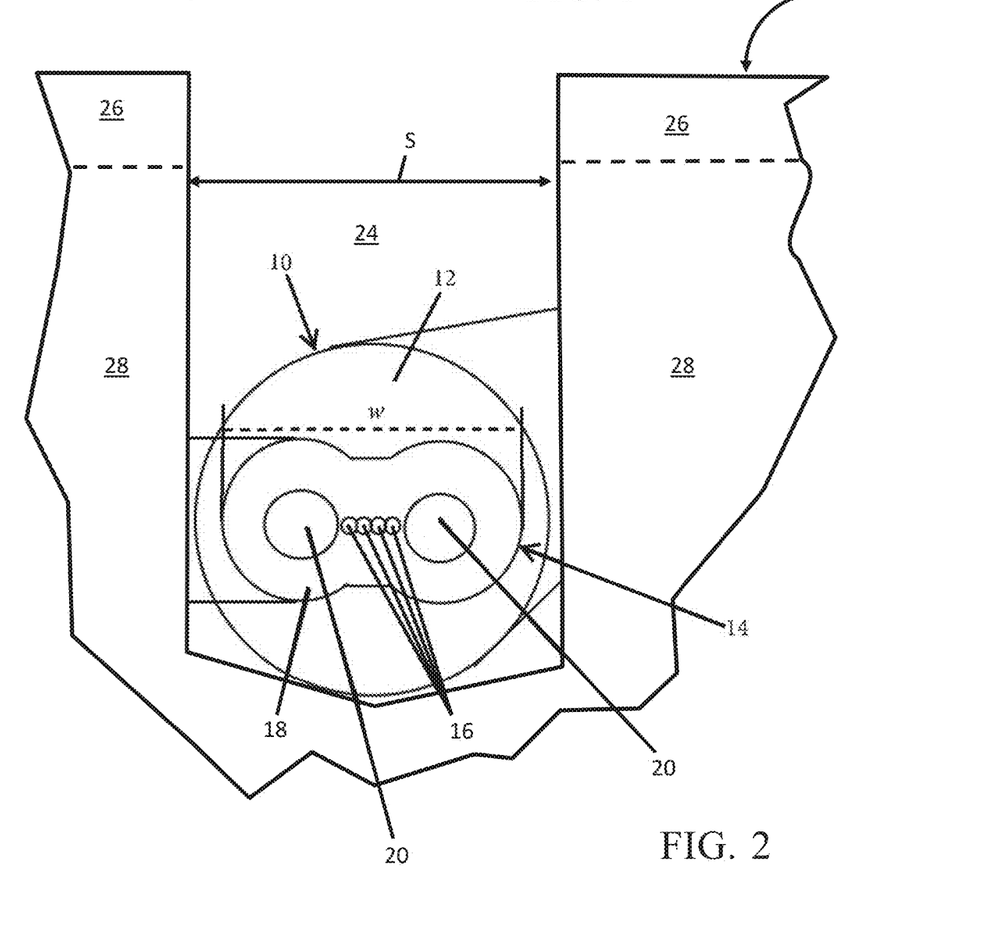
FIG. 2 depicts an optical fiber cable with an upjacket inserted into a channel in a roadbed, according to an exemplary embodiment.

As shown in FIG. 2, the optical fiber cable 10 is configured to be installed in a roadbed 22. In particular, a channel 24 is formed into the roadbed 22, i.e., in either a base layer 26 or through the base layer 26 into the subbase 28 (e.g., binder layer, gravel, dirt, concrete, etc.). The base layer 26 is generally from 1 to 8 inches thick, and the subbase 28 is generally from 4 to 12 inches thick. The channel 24 will generally be from 3 to 12 inches in depth. However, the thickness of the roadbed 22, including the thicknesses of the base layer 26 and subbase 28, can be different depending on the locality, paving requirements, expected traffic, etc. The depth of the channel 24 can accordingly be varied depending on the particularities of the roadbed 22 into which it is formed.

The technology that underpins the use of certain materials in a roadbed is well established and must be compliant any governmental bodies and engineering principles. Consequently, it is advantageous that the materials used in a cable for installation into a roadbed surface be compatible with and fit for the particular type of asphalt cement used in a particular roadbed.

An asphalt roadbed is comprised of several major components and the composite structure may be called asphalt cement. Asphalt cement may be comprised primarily of 1) an aggregate consisting of inorganic materials such as stones, ground rock, and possibly sand, the size of each which may vary; and 2) bitumen (or asphalt), which is a product derived from petroleum feedstreams and consists of a complicated mixture of polycyclic aromatic hydrocarbons (asphaltenes and maltenes), aliphatic hydrocarbons and trace materials.

In addition to the bitumen and aggregate, other components may be added to the asphalt cement to improve performance or reduce cost. Anti-strippers are additives that prevent water ingress by improving asphalt aggregate adhesion. The asphalt compound may include anti-strippers such as polyphosphoric acid and amines. Extenders may be used in the asphalt compound to replace a portion of the asphalt cement in order to extend the amount available for use. Extenders such as recycled engine oil base (REOB) and vacuum tower asphalt extender (from refinery towers) may be used in the asphalt compound. Modifiers, such as polymers and copolymer, may be added to improve asphalt rheology and performance. Examples of modifiers include polymers such as styrene-butadiene styrene (SBS), styrene-butadiene (SB), ethyl vinyl acetate (EVA) and reactive (epoxy functionalized) EVA. Waste, such as crumb rubber from old tires, may also be added to the asphalt compound. Because of these additives, when used in certain applications the asphalt cement may be referred to as highly modified asphalt (HMA).

In accordance with aspects of the present disclosure, the cable upjacket may improve or maintain the existing performance characteristics of the roadbed and roadbed materials through controlled material compatibilities. In addition to increasing the region around the cable interface adhesion by incorporation of the polymer, the swelling and possible migration of the HMA may be controlled through means such as varying the molecular weight of the polymer used or crosslinking the polymer to create a swollen gel-like structure around the cable.

Examples cited above are copolymers which are composed of more than one monomer and the ratio of the monomers is also used to control characteristics of the polymer with the bitumen. Improvement or tuning of the HMA polymer upjacket may be obtained by the addition of the asphalt additives discussed above, such as, but not limited to, anti-stripping additives, or other additives capable of initiating or reacting with the (co)polymer to cause crosslinking of the (co)polymer.

In addition to using the molecular weight, crosslinking, and chemical composition of the polymer as a route to tailoring the cable upjacket's interaction with the bitumen, polymer blending or filling of the polymer may serve as an alternative approach. Blending of polymers is a known route to using two or more polymers of differing properties which, when combined, increase the potential use of the blend.

Polymer blends fall into two distinct categories, miscible and immiscible. A miscible blend is a polymer blend where the two polymers dissolve into one another and have one set of physical properties, such as a single glass transition located at the weighted average of the two polymers. A well know example of such a miscible blend is polyphenylene-oxide and styrene. Immiscible blends consist of two types, compatible and incompatible blends. In both cases, the polymers do not dissolve into one another and will demonstrate two sets of physical properties such as glass transition. The difference between the two types of immiscible blends is that a compatible blend will have favorable surface interactions and exhibit a stable post-mixing morphology, while the opposite will be true for an incompatible blend. Polymer blends are typically mixed in a separate processing step using a twin screw extruder prior to extrusion to form an upjacket.

A blend of two or more polymers affords an additional approach for upjacket modification. For example, a miscible blend of polyphenylene oxide with the styrene chains of a Styrene-Butadiene-Styrene (SBS) copolymer may be used to increase the thermal performance of the SBS. In another embodiment, an immiscible blend of EVA with a polyolefin polymer, such as high, medium, low density polyethylene, linear low density polyethylene (HDPE, MDPE, LDPE and LLDPE respectively) or polypropylene (PP) may be used. These latter blends may be used to tune the adhesion of the HMA polymer to the bitumen by introducing a less soluble or insoluble polymer at some level into the cable, to develop a cable that may be more readily removed from the asphalt if necessary. Well known methods exist to quantify this adhesion and a representative approach described in the American Assoc. of State Highway Transportation Officials (AASHTO) document TP 114-17 "Provisional Standard Method of Test for Determining the Interlayer Shear Strength (ISS) of Asphalt Pavement Layers".

The polyolefins addition may also add additional stiffness to the HMA upjacket if required to insure a suitable road performance, while the presence of the EVA in the same blend will help prevent mechanical failure of the polyolefin. As these blends are compatible, they will be easily processed and provide stable dispersions. Moreover, improvement or tuning of the up jacket polymer blend may be obtained by the addition of asphalt additives such as, but not limited to, anti-stripping additives or additives capable of crosslinking one or both of the polymers.

Incompatible blends may also be considered for use in cable jacket upjackets. A limitation to their deployment is the fact that the two polymers will be prone to separation. This issue may be addressed by adding a compatibilizing molecule (much like a surfactant) to improve the mixing and surface energy between the two or more polymers. This compatibilizing molecule may be added in addition to other additives such as (but not limited to) anti-stripping molecules, crosslinking agents, etc.

A remaining possibility for a polymer blend is to take advantage of potential reactive functionality on a polymer or additive to alter or modify the polymer molecules. An example would be to react amine terminated nylon 6 with the epoxy functionality on Elvaloy 4170 or a maleic anhydride functionalized polyolefin. This may be done either in solution or during a reactive extrusion process. The reactive extrusion can be used to compatibilize incompatible polymer blends as well by forming bonds between the two or introducing regions of shared chemical compatibility.

The bitumen or asphalt component of the asphalt cement, as stated earlier, is a complex mixture of molecules known as alphaltenes, maltenes and saturated hydrocarbons. The ability to determine the make up is known and when a mix with an aggregate is prepared to make asphalt cement the properties of the individual components may be expected to provide differing performance. An asphalt cement is graded by one of the following methods:

The viscosity method where the asphalt viscosity is measured at 60° C. in a rolling thin film oven test (RTFOT) and reported out.

PG ratings—The pavement grade (or PG rating) was instituted in 1993. It consists of the following: PG XX–YY (read XX minus YY). XX is the average upper temperature for the area deployed in and YY is the average lowest temperature for the same. It is derived from several tests (rheological and aging) and calculations made with the SuperPave software which uses the following steps:
1. Rotational viscosity to predict performance in construction;
2. Dynamic shear rheometty.

The complex viscosity test is used to predict rutting (permanent deformation and measure complex viscosity unaged and after aging in an RTFOT and $G^*/\sin \delta$ must be >1 KPa unaged and >2.2 KPa aged (where $\delta$=phase angle and $G^*$=complex viscosity). The mass loss on RTFOT is also measured to help predict aging effects from manufacture and construction.

Fatigue is measured to predict cracking performance over 7-10 year life span. It is accomplished by placing the binder in a pressure aging vessel under 2000 kPs (300 psi for 20 hours. The value $G^* \sin \delta$ is then calculated and must be ≤5000 Kpa.

The bending beam rheometer (BBR) is used to predict thermal cracking. And is essential a bending beam creep test at low temperature.

The direct tension test (DTT) is used in conjunction with the BBR and is essentially a tensile test like we do an an instron and reports out failure load by stress.

The BBR and DTT are used to calc Tcritical (Tc). Tc is defined as the temperature at which the thermal stress in the material (BBR) exceeds its strength (DTT) and requires as input:
1. BBR for at least 2 temps at 8, 15, 30, 60 120, and 240 seconds
2. DTT for at least 1 temp
3. Tc is calculated with a software program is Superpave called TSAR.

Multiple stress creep recovery tests (MSCR)—These tests are just as the name implies used to characterize highly modified asphalt (HMA). HMA is asphalt that contains a large amount of polymer and needs to be distinguished from modified asphalt which has polymer added as an additive to strengthen.

Blends of the HMA (co)polymers and/or HMA blends (be they miscible, compatible or incompatible) for use in upjackets may be pre-compounded with bitumen prior to extrusion to form the upjacket. The precompounding of the asphalt opens the possibility of masterbatches being made for later inclusion into an HMA or blend, but may also be used to increase the rate of the roadbed bitumen interaction with the upjacket, to further fine tune the adhesive characteristics of the upjacket, or to cause the upjacket to function in a manner similar to a bituminous tack coat in a road patch scenario. In accordance with other aspects of the present disclosure, use of different PG grades of bitumen may modify the rheology or structural characteristics of the upjacket roadbed interface. The presence in the upjacket of bitumen may have further benefit to an upjacket outside of the roadbed performance, such as reduction in or complete cessation of rodent chew of the cable, increased UV stability and anti-microbial activity if the cable should be exposed to these possible threats.

Once the roadbed has been opened and the cable with upjacket deployed, re-sealing the roadbed will be necessary. Because the cable will consist of polymers with enhanced interactions with bitumen, a preferred approach would be, but not limited to, the use of asphalt cement or recycled asphalt pavement (RAP) as the re-fill or patch material. Also, as will be described in subsequent sections, the trench for this deployment method would be expected to be much smaller and the fill to be more like the roadbed. One skilled in the art may also consider the introduction of other technology into the trench such as water blocking sheets, bituminous tack coats, and related additives. The use of other patching techniques such as cold mix, proprietary cold mix, spray injection and emulsified asphalt cement is also incorporated into this disclosure as are on-asphalt approaches based on polymeric or related sealants.

Figure 3:
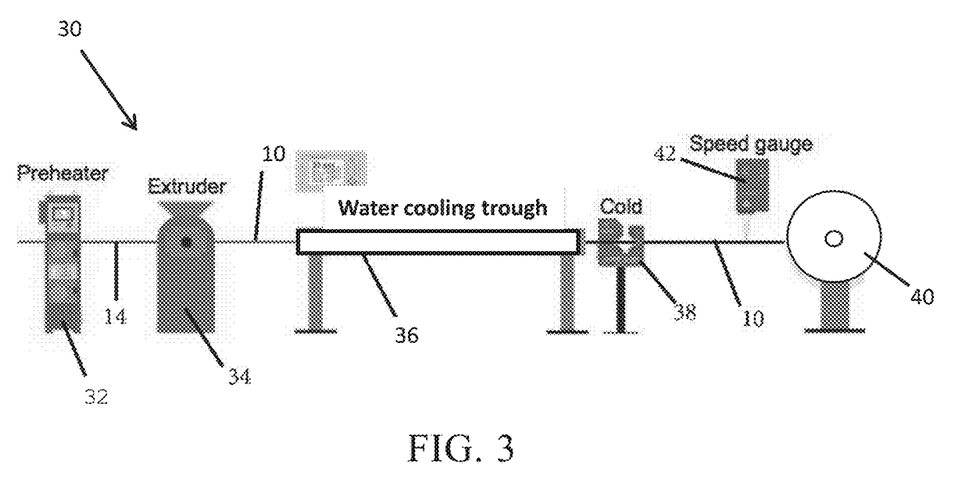
FIG. 3 depicts an extrusion processing line for providing an upjacket to a cable, according to an exemplary embodiment.

In accordance aspects of the disclosure as depicted in FIG. 3, the upjacket 12 is extruded around the drop cable 14 on an extrusion line 30. In the depicted embodiment, the extrusion line 30 includes a preheater 32 to preheat the drop cable 14 to improve adhesion of the upjacket 12 to the cable jacket 18 of the drop cable 14. The preheated drop cable 14 then enters the extruder 34 where the upjacket 12 is applied to the drop cable 14. After exiting the extruder 34, the now upjacketed cable 10 is run through a water cooling trough 36 to cool/set the upjacket 12 material. The cable 10 then passes through a drying station 38 and then coiled at take-up roll 40. The speed of the cable 10 exiting the extruder 34 is monitored via speed gauge 42, and the speed can be adjusted to provide additional cooling time, for example. In other embodiments, the drop cable 14 is not yet provided with a cable jacket 18, and instead, the upjacket 12 material is extruded around the optical fibers 16 and strength members 20 to act as the cable jacket 18. In this way, the optical fiber cable 10 only has a single jacket, which can provide an optical fiber cable 10 having a smaller cross-section.

Figure 4:
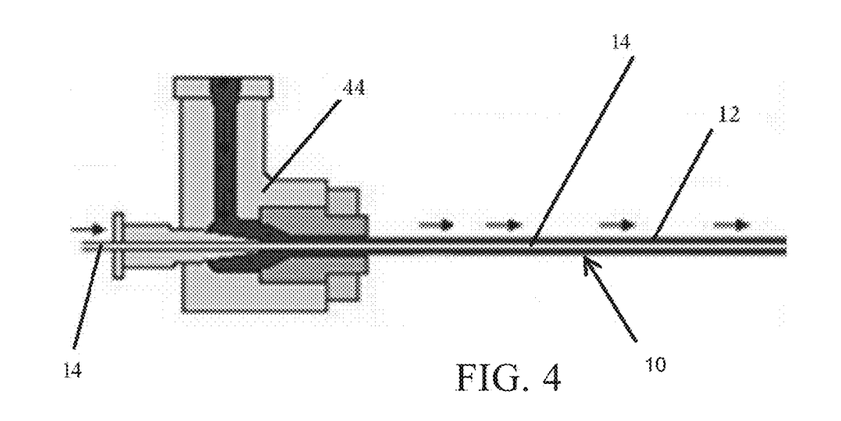
FIG. 4 depicts a crosshead extrusion die for applying the upjacket to a cable, according to an exemplary embodiment.

Referring now to FIG. 4, a specific extrusion die 44 is depicted. The extrusion die 44 is a crosshead extrusion die. The drop cable 14 is fed through a melt flow of upjacket 12 material, and the extrusion die 44 controls the thickness of the upjacket 12 applied to the drop cable 14. In FIG. 4, the upjacketed cable 10 is depicted exiting the extrusion die 44 where it can then enter, e.g., a water cooling trough 36 as shown in FIG. 3.

In a particular embodiment, an upjacket 12 may be comprised of Elvaloy 4170 reactive EVA polymer (DuPont Corp.) The upjacket 12 may be extruded over a drop cable 14 substantially similar to the cable depicted in FIG. 1, which has a cross-sectional width greater than height h. In performing the extrusion, a 2.5 inch extruder having a length to diameter ratio of 24:1 and equipped with a barrier flight screw may be used. The compression ratio was greater than 2.5. Semi-compression extrusion tooling was used with the tip inner diameter being slightly larger than the maximum outer dimension of the cable. In the particular embodiment described, the tip inner diameter was 5.7 mm and the die inner diameter was 7.4 mm. The drop cable 14 was run at 10 mpm (meters per minute), screw speed was set to 9 RPM, and melt temperature was 222° C. The optical fiber cable 10 produced had an oval cross-section with final measurements of 6.5 mm×7.5 mm. Although described above as being a barrier flight screw, in accordance with other aspects of the disclosure, a single flight screw or a twin screw extrusion process may be used. Moreover, additives may be incorporated at one or more feedpoints into the extrusion process. The feedpoints may at the same point as the polymer introduction or at various downstream points along the longitudinal length of the extruder.

While the optical fiber cable 10 described herein is formed from a drop cable 14, other optical fiber cables can also be used as the base cable to which the upjacket 12 is applied. In exemplary embodiments, the upjacket 12 is applied to cables such as the ROC Drop cable, Mini-Extend, I/O FR cables, Rugged Drop, Single-tube with stranded strength elements, RPX, AOC, and ActiFi Composite Cables (all available from Corning Incorporated, Corning, N.Y.).

Additionally, as mentioned above, various embodiments of the optical fiber cable 10 include upjackets 12 made of other polymers, combinations of polymers, and/or layers polymers. Indeed, different grades of the same polymer can be used in the same upjacket 12. For example, a softer grade of polymer is used nearer to the drop cable 14 while a stiffer/harder grade of polymer is used nearer to the outer surface of the optical fiber cable 10. In another example, the polymers in the upjacket 12 are layered so as to transition from high compatibility with the cable jacket 18 on the interior to high compatibility with the roadbed 22 on the exterior. In a sense, enhancing the compatibility of the optical fiber cable 10 with the roadbed 22 not only benefits the roadbed 22, but also as a result of the compatibility, the roadbed essentially becomes another layer of protection for the optical fiber cable 10.

Figure 5:
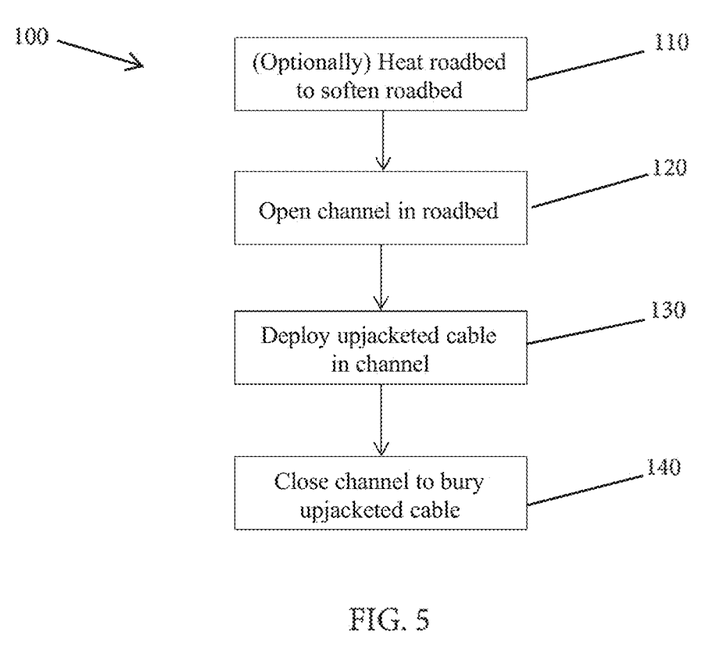
FIG. 5 is a process flow diagram for installing an optical fiber cable having an upjacket in the roadbed, according to an exemplary embodiment.

Having described the upjacketed cable 10 and a method of applying the upjacket 12 to the cable 10, a method of deploying the upjacketed cable 10 is now provided. The method 100 is summarized in the flowchart of FIG. 5. In particular, the method 100 is particularly useful for installing optical fiber cable to a premises (i.e., fiber to the home (FTTH) or fiber to the premises (FTTP)). Optionally, a first step 110 of heating the roadbed can be performed. For example, in embodiments, the roadbed is heated to, e.g., 50° C., 100° C., or 150° C., so as to soften the roadbed. In embodiments where the optical fiber cable is installed while the road bed is being paved or when the optical fiber is being installed on a particularly hot day, for example, then the step of heating the roadbed may not be necessary. When the roadbed is sufficiently soft, the second step 120 of forming or opening a channel is performed. The channel 24 as shown in FIG. 2 is representative of the channel 24 that is created according to the presently described method 100. In particular, the channel 24 has a width S that is the same or slightly larger than the width of the upjacketed cable 10. As discussed above, the final dimensions of the upjacketed cable 10 in the exemplary embodiment were 6.5 mm×7.5 mm. Thus, the width S of the channel 24 may, in embodiments, be less than 1 cm. In an embodiment, the channel 24 is opened using a vibratory plow. Advantageously, the small channel may make repair easier. For example, instead of digging up the damaged cable, a new upjacketed cable 10 could simply be laid adjacent to it, or a new section of cable could be spliced into the buried cable to run next to the damaged section of cable, thereby eliminating the need to remove the damaged section of cable.

Returning to FIG. 5, once the channel 24 is open, a third step 130 is to deploy the unjacketed cable into the channel. As with the previous step, the upjacketed cable can be deployed using a vibratory plow. In particular embodiments, the vibratory plow includes a channel running through the plow blade through which the upjacketed cable is fed. In this way, as the vibratory plow is pulled through the roadbed, the upjacketed cable is deposited in the roadbed at the same time. The final step 140 of the method 100 may be to close the channel to bury the upjacketed cable in the roadbed. In accordance with aspects of the disclosure, all of the steps of the method may be performed using a single piece of equipment, such as, for example, a vibratory plow equipped with one or more heaters a forward heater for heating the roadbed and a rear heater for closing the channel). Advantageously, the channel 24 can be closed with the asphalt concrete that is the same as that used to pave the road and will not require dissimilar patch materials.

The embodiments provided herein provide several advantages to FTTH or FTTP installations. In particular, the presently disclosed upjacketed cable and method of deploying the upjacketed cable have a significantly less damaging impact on a roadbed than other conventional cable installations. Further, the upjacketed cable can be installed in moist environments, e.g., the upjacketed cable can be installed in the midst of rainy weather. By comparison, other conventional methods that utilize a protective bed of polyurea have to be installed in dry environments because moisture will affect the curing of the polyurea protective bed. Still further, because presently disclosed upjacketed cable and method of deployment do not require cure time, the installation of the upjacketed cable can be performed more quickly than other conventional methods of installation. Another additional advantage of the upjacketed cable is that the material or materials used to make the upjacket do not leach chemicals, such as plasticizers, into the roadbed that are harmful to the roadbed. Instead, the upjacket can be specifically designed to be inert with respect to the roadbed or even beneficial to the roadbed by leaching beneficial chemicals into the roadbed.

In accordance with yet other aspects of the present disclosure, the upjacketed cable may have surface features, such as grooves or knurling to increase surface area for bonding/coupling to the road surface. Moreover, larger distribution cables may incorporate various upjacketed cables stranded together such that one or more of the upjacketed cables may be separated or preterminated from the main distribution cable at predetermined positions along the length of the distribution cable. Although described herein as pertaining to cables, the upjacket materials and procedures for incorporating into roadbeds may be used with or applied to ducts or other suitable mechanical structures for embedding in roadways.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable configured for installation in a roadbed, the optical fiber cable comprising:
   at least one optical fiber;
   a polymeric cable jacket surrounding the at least one optical fiber; and
   an upjacket surrounding and in contact with the polymeric cable jacket, wherein the upjacket is comprised of at least one of a styrene-acrylic, a styrene-ethylene/butylene block copolymer, a vinyl acetate ethylene, an ethylene vinyl acetate, a polyvinyl acetate, a styrene-butadiene block copolymer, a styrene-isoprene block copolymer, or a styrene-butadiene-styrene triblock copolymer;
   wherein the upjacket defines an outermost surface of the optical fiber cable; and
   wherein the upjacket comprises a chemical configured to leach into the roadbed that stiffens the roadbed or increases the elasticity of the roadbed.

2. The optical fiber cable of claim 1, wherein the upjacket comprises an additive, wherein the additive includes at least one of polyphosphoric acid, bitumen, or HMA polymers.

3. The optical fiber cable of claim 1, wherein the upjacket is configured to swell or uptake roadbed bitumen to create a highly polymer modified region adjacent to the roadbed cable.

4. The optical fiber cable of claim 1, wherein the upjacket is comprised of at least two layers.

5. The optical fiber cable of claim 4, wherein a first layer is in contact with the polymeric cable jacket, wherein a second layer is in contact with the roadbed, and wherein the second layer is harder than the first layer.

6. The optical fiber cable of claim 1, comprising no polyurea between the polymeric cable jacket and the roadbed.

7. The optical fiber cable of claim 1, wherein the polymeric cable jacket comprises at least one of a polyethylene, a polypropylene, a polyolefin elastomer, or a poly(ethylene-vinyl acetate).

8. An optical fiber cable configured for installation in a roadbed, the optical fiber cable comprising:
   at least one optical fiber;
   a polymeric cable jacket surrounding the at least one optical fiber; and
   an upjacket surrounding and in contact with the polymeric cable jacket, wherein the upjacket is comprised of at least one of an acrylic, a styrene-acrylic, a styrene-ethylene/butylene block copolymer, a vinyl acetate ethylene, an ethylene vinyl acetate, a polyvinyl acetate, a styrene-butadiene block copolymer, a styrene-isoprene block copolymer, or a styrene-butadiene-styrene triblock copolymer;
   wherein the upjacket defines an outermost surface of the optical fiber cable; and
   wherein the polymeric cable jacket comprises at least one strength member.

9. The optical fiber cable of claim 8, wherein the strength member comprises at least one of a metal rod, a metal wire, or a glass fiber reinforced plastic rod.

10. The optical fiber cable of claim 1, wherein the at least one optical fiber comprises a plurality of optical fibers arranged in an optical fiber ribbon.

11. The optical fiber cable of claim 1, wherein the at least one optical fiber comprises a plurality of optical fibers arranged in one or more buffer tubes.

12. The optical fiber cable of claim 1, wherein the upjacket is a polymer blend further comprising at least one of a polyphenylene oxide, a polyethylene, or a polypropylene.

13. The optical fiber cable of claim 12, wherein polymers of the polymer blend are miscible.

14. The optical fiber cable of claim 12, wherein polymers of the polymer blend are immiscible.

15. An optical fiber cable configured for installation in a roadbed, the optical fiber cable comprising:
   at least one optical fiber;
   a polymeric cable jacket surrounding the at least one optical fiber; and
   an upjacket surrounding and in contact with the polymeric cable jacket, wherein the upjacket is comprised of at least one of an acrylic, a styrene-acrylic, a styrene-ethylene/butylene block copolymer, a vinyl acetate ethylene, an ethylene vinyl acetate, a polyvinyl acetate, a styrene-butadiene block copolymer, a styrene-isoprene block copolymer, or a styrene-butadiene-styrene triblock copolymer;
   wherein the upjacket defines an outermost surface of the optical fiber cable; and
   wherein the upjacket comprises a surface feature configured to couple the upjacket to the roadbed.

16. The optical fiber cable of claim 15, wherein the surface feature comprises a grooved or knurled surface.

17. The optical fiber cable of claim 4, wherein the at least two layers comprises a first layer in contact with the polymeric cable jacket and a second layer configured to be in contact with the roadbed and wherein the first layer is more compatible with the polymeric cable jacket than the second layer and the second layer is more compatible with the road bed than the first layer.

18. The optical fiber cable of claim 1, wherein a first outer surface of the polymeric jacket defines a first shape, wherein a second outer surface of the upjacket defines a second shape, and wherein the first shape is different than the second shape.

19. The optical fiber cable of claim 1, wherein the upjacket comprises an epoxy-functionalized ethylene vinyl acetate.

\* \* \* \* \*